United States Patent [19]

Ando et al.

[11] 4,212,624
[45] Jul. 15, 1980

[54] HOT-RUNNER MOLD AND INJECTION MOLDING METHOD MAKING USE OF THE SAME

[75] Inventors: Nobuo Ando; Isao Satou; Kazuo Maehara, all of Yokohama, Japan

[73] Assignee: Asahi Kasei Kogyo Kabushiki Kaisha, Osaka, Japan

[21] Appl. No.: 913,295

[22] Filed: Jun. 7, 1978

[30] Foreign Application Priority Data

Dec. 9, 1976 [JP] Japan .................. 51-148060

[51] Int. Cl.² .............................................. B29F 1/08
[52] U.S. Cl. ...................................... 425/548; 425/563
[58] Field of Search ............... 425/547, 548, 549, 567, 425/568, 572, 563, 569-571

[56] References Cited

U.S. PATENT DOCUMENTS

| | | | | |
|---|---|---|---|---|
| 3,010,155 | 11/1961 | Gilmore | ............................ | 264/329 |
| 3,093,865 | 6/1963 | Peters | ............................ | 425/547 |
| 3,530,539 | 9/1970 | Gellert | ............................ | 425/547 |

FOREIGN PATENT DOCUMENTS 1929363 12/1970 Fed. Rep. of Germany .
46-18627 5/1971 Japan ........................................ 425/568
48-5093 2/1973 Japan .

*Primary Examiner*—Thomas P. Pavelko
*Attorney, Agent, or Firm*—Armstrong, Nikaido, Marmelstein & Kubovcik

[57] ABSTRACT

A mold suitable for use in simultaneous molding of a large number of articles at a time by hot-runner molding technique. The mold has a hot-runner block in which disposed are a plurality of gates through which the molten resin is delivered to the molding cavities formed in a cavity block which is usually kept at a low temperature. The gate area of the hot-runner block is kept in contact with the cavity block, for the safe deliver of the resin to the molding cavities, in the injection step and, therefore, is cooled by the cavity block. Consequently, when the injection is completed, the gate area has been cooled to such a low temperature as to cause a solidification of the resin in the gate area. The hot-runner block is then separated from the cavity block and brought into contact with a hot gate-temperature recovering block, so that the gates are heated to remelt the solidified resin, before the next batch of injection is performed, so as to recover the fluidity of the resin.

23 Claims, 13 Drawing Figures

HOT-RUNNER MOLD AND INJECTION MOLDING METHOD MAKING USE OF THE SAME

BACKGROUND OF THE INVENTION

The present invention relates to a mold adapted for use in injection molding of thermoplastic resin articles, and to an improved method of injection molding making use of the mold.

More particularly, the present invention is concerned with a novel construction of a hot-runner type mold which can be suitably used in simultaneous molding of a number of articles without being accompanied by any leakage of the molten resin or the clogging of the gate with the molten resin, and capable of functioning without fail and ensuring a good quality of the products through an adequate cooling and solidification of the resin, as well as with a method of carrying out an injection molding making use of the hot-runner type mold.

The hot-runner technic in the injection molding process is now attracting attentions of those who are concerned with this field of industry, as being one of the most effective measures for the rationalization of the whole molding process, because this technic can exclude needless and obstructive by-products or appendix such as solidified sprues and runners annexed to the molded products. In fact, many successful examples of practical use of this hot-runner technic have been reported.

However, this hot-runner technic cannot be advantageously used in the molding processes in which the ratio of weight of runner to the total weight of the product or products is relatively large, as in the production of small articles or in the simultaneous molding of a number of articles. Namely, in these cases, the hot-runner system for one molded article occupies a too large space, so that the number of articles obtainable from a given size of mold, in case of a simultaneous molding of a plurality of articles, is limited not by the size of the article but rather by the size of the runner system, often resulting in an unacceptably small yield. This goes quite contrary to the lowering of the production cost which is the major aim of the hot-runner technic.

Figure 1:
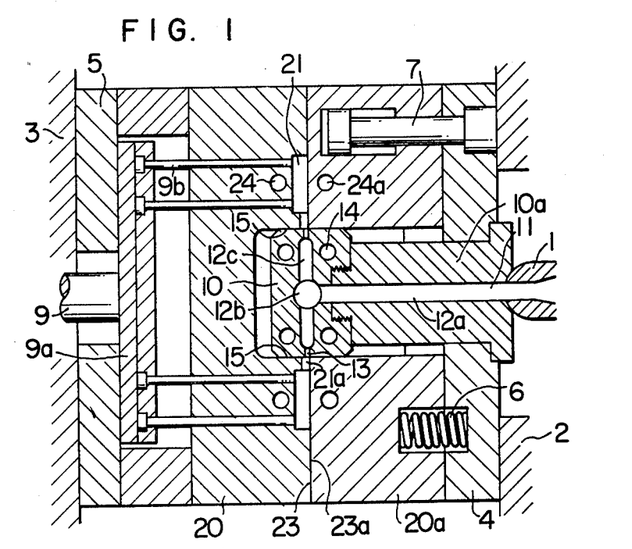
FIG. 1 is a schematic longitudinal sectional view of a conventional hot-runner mold in the closed state, i.e. in the state of injection.
Figure 2:
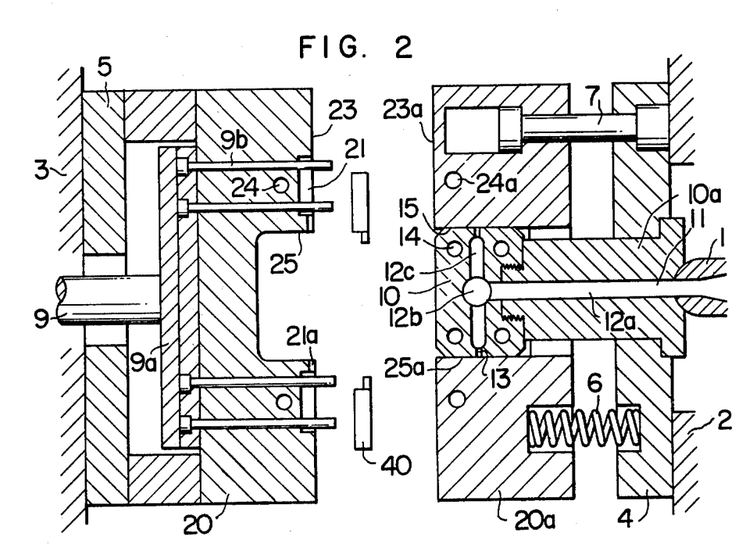
FIG. 2 is a view similar to that of FIG. 1 but showing the mold in the opened state.

In order to overcome this problem, there has been proposed a mold as shown in FIGS. 1 and 2, having a simple and, accordingly, less expensive construction and specifically intended for use in a simultaneous molding of small-sized articles by means of the hot-runner molding technic.

More specifically, referring to FIGS. 1 and 2, blocks 4 and 5 of a mold are fixed, respectively, to a stationary die plate 2 and a movable die plate 3 of an injection molding machine. A moving side cavity block 20 and a stationary-side cavity block 20a are connected to the blocks 5 and 4, respectively, in a predetermined positional relationship which will be detailed later. A hot runner block is constituted by a hot-runner block body 10 and a hot sprue bush 10a. The hot sprue bush 10a is fixed to the block 4 and is closely contacted at its one end by a nozzle 1 of the injection molding machine in such a manner that an injection port of the nozzle for injecting a molten resin is made to communicate a molten resin supply port 11 of the hot sprue bush.

The hot-runner block body 10 is a rectangular member the longer side of which extends in the direction normal to the plane of the drawing and has two parallel surfaces facing in opposite directions. These parallel surfaces constitute gate opening surfaces 15. A plurality of gates 13 are formed to open in each of the gate opening surfaces 15, 15, in a row extending along the length of the hot-runner block body 10.

The gates 13 are in communication with a main runner 12b extending in the longitudinal direction of the body 10, through branch runners 12c, while the main runner 12b communicates the molten resin supply port 11, through a sprue 12a.

Heating bodies 14 are embedded in the hot-runner block body 10 and in the hot sprue bush 10a, so as to maintain them at a temperature high enough to ensure a smooth flowing of the resin therethrough.

The moving-side cavity block 20 has two opposing contacting surfaces 25 which are adapted to contact the gate opening surfaces 15 of the hot-runner block body 10, at least when the mold is closed. The moving-side cavity block 20 further has a plurality of recesses formed in the parting surface 23, which constitutes molding cavities 21 for molding the destined articles. Each molding cavity 21 has a molten-resin pouring port 21a opening at portions of the cavity block 20 corresponding to each of the gates 13 formed in the hot-runner block body 10.

The stationary side cavity block 20a has two opposing contacting surfaces 25a adapted to slidingly contact the corresponding gate opening surfaces 15 of the hot-runner block body 10. A spring 6 is disposed between the stationary block 20a and the block 4, so as to bias them away from each other. The stroke over which these two members are movable away from each other is however limited by a stopper 7.

Conduits or passages for cooling water are formed in the cavity blocks 20 and 20a, so that these cavities may be cooled down to a temperature low enough to promote the solidification of the resin.

In FIG. 1, the mold is shown in the state of injection, in which the molten resin is injected at a high pressure into the mold through the nozzle of the injection molding machine, while, in FIG. 2, the mold is shown in the opened state in which the movable die plate 3 of the injection molding machine has been moved to allow an ejection of the molded articles 40.

During the opening of the mold, i.e. in the transition period in which the state of the mold is changed from the closed state as shown in FIG. 1 to the opened state as shown in FIG. 2, the spring 6 functions to move the stationary-side cavity block 20a in relation to the block 4. Consequently, the stationary-side cavity block 20a is moved relatively to the hot-runner block body 10, so that the contacting surfaces 25a comes to close the openings of the gates 13, thereby to prevent molten resin from leaking out of the gates. At the same time, the molded articles 40 are separated from the fluidized portion of the material resin.

On the other hand, due to the opening of the mold the movable die plate 3 is moved until it abuts against a base plate (not shown) of the injection molding machine. On that occasion, an ejecting rod 9 abuts against a protrusion (not shown) provided on said base plate, and is relatively moved in right direction in FIG. 2 with respect to the fixed block 5. Accordingly, the ejector pins 9b supported on a plate 9a connected with the ejecting rod 9 eject the molded articles 40 from the molding cavities 21.

In the hot-runner mold having the described arrangement, the construction of the gates is most simplified and the distance between adjacent gates, i.e. the pitch at which the gates are disposed, is minimized, because the independent installations of heat control means and leak-prevention valves for respective gates are eliminated. At the same time, since the gate openings are closed by the contacting surfaces of the cavity blocks as stated before, so that the troubles such as leaking out of the molten resin from the gate opening are fairly avoided.

This construction of the mold however has a fatal drawback. Namely, in this mold, the hot-runner block which has to be maintained at a high temperature is kept in contact with the cavity blocks which have to be maintained at a low temperature, over the whole period of the molding process. Consequently, the temperature of the gates which are located near the boundary between the hot and cold parts tends to drop below the desired temperature, at a period in which the gate temperature has to be sufficiently high, i.e. at the time of the injection. To the contrary, the cavity block, which has to be cold enough to promote the solidification of the resin, tends to become excessively hot.

In order to maintain a sufficiently high temperature of the gates, it has been proposed to further heat up the whole hot-runner block, or to provide a means for heating specifically the portions around the gates.

However, the former way of solution is unacceptable in that it is likely to incur an excessive heating of the portions of the resin passages resulting, possibly, in undesirable thermal decomposition of the resin.

The latter way of solution is also unacceptable in that the thermal flow toward the cavity blocks is enhanced to hinder an appropriate cooling of the articles, possibly resulting in various problems such as deteriorated dimensional precision, and buckling and deformation of the articles.

SUMMARY OF THE INVENTION

It is therefore a major object of the invention to provide an improved hot-runner mold suitable for use in simultaneous molding of a number of articles and capable of overcoming all of the above explained problems of the prior art, but still maintaining the advantages such as prevention of leak of resin.

This object is achieved basically by recovering the temperature suitable for the molding around the gates of the hot-runner block, in advance to the injection. This idea is carried out in a negative sense by disconnecting the portion of the hot-runner block around the gate at least immediately before the injection, so that the portion of the hot-runner block around the gates may become less likely to be cooled than while it is kept in contact with the cavity blocks.

At the same time, this idea can be put into practical use positively through bringing a hot block specifically disposed near the gates into contact with the portion of the hot-runner block around the gates. Once the process is advanced to the injection step, the portion around gates is maintained rather for an easier cooling, so that the temperature of the gate may not comes excessively high.

More specifically, a first constructional requisite for the invention resides in a provision of a hot-runner block. The hot-runner block has a means for maintaining the hot-runner block itself at a desired high temperature, an inlet port through which the molten resin is forced into the hot-runner block, i.e. a molten resin supply port, outlets through which the molten resin is delivered from the hot-runner block into the cavities, i.e. gates, and a passage through which the molten resin flows from the inlet to the outlets.

The second constructional requirement is that a cavity block is provided. The cavity block is provided with a means for maintaining the cavity block itself at a desired low temperature, and includes spaces into which the molten resin is supplied and in which the molten resin is cooled and solidified to become the molded articles, i.e. molding cavities, and ports through which the molten resin injected from the gates is poured into the molding cavities, i.e. molten resin pouring ports.

The third constructional requisite resides in the provision of a block for recovering the gate temperature. This gate-temperature recovering block has such a function as to recover the predetermined high temperature of the gate, upon contact with the gate portion of the hot-runner block. In other words, the gate-temperature recovering block is adapted to heat the gate portion, which has been maintained at a low temperature due to the direct contact with the cavity block, to a temperature higher than the low temperature.

The fourth requisite resides in the following function. Namely, the gates of the hot-runner block and the molten resin pouring ports of the cavity block are brought into alignment at least at the time of the injection, such that the portions of the hot-runner block around the gates are materially brought into contact with the cavity block. However, the hot-runner block and the cavity block are so constructed as to be moved relatively to each other, such that the gates of the hot-runner block and the molten resin pouring ports of the cavity block are separated from each other, so as to break the material contact of the gate area and the cavity block. At the same time, the arrangement is such that the aforementioned gate-temperature recovering block is brought into contact with the gate area over at least a part of period in which the gates of the hot-runner block are positioned away from the molten resin pouring ports of the cavity block.

The hot-runner mold of the invention has above started constructional features.

The term "means for maintaining the hot-runner block at a desired high temperature" does not suggest such means as adapted to maintain the whole part of the hot-runner block over the whole period of the molding process. In fact, such means falls out of the spirit of the invention. More specifically, the temperature of the gate area may be lowered at the time of completion of the injection to such a low level as to prevent the resin from freely flowing and, rather, this point constitutes one of the critical feature of the invention.

Thus, the term "means for maintaining the hot-runner block at a desired high temperature" designates broadly such a means as would raise the temperature of the hot-runner block, in combination with the heating effort made by the gate-temperature recovering block, to such a high level as to afford a free flow of the molten resin, in the period after the gate area has been brought into contact with the gate-temperature recovering block to the time of commencement of the next batch of the injection.

The hot-runner mold of the invention having above described structural features can be embodied in various practical forms, depending on the shapes of the articles to be molded, types of the injection molding machine and other conditions.

The aforementioned and other objects, as well as advantageous features will become more clear from the following description of the preferred embodiments taken in conjunction with the accompanying drawings in which:

DESCRIPTION OF THE PRERRED EMBODIMENTS

Figure 3:
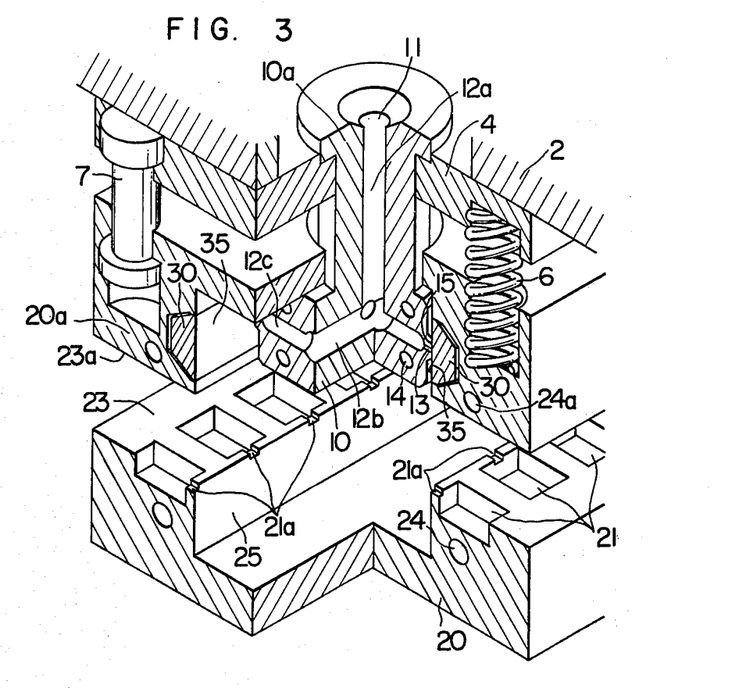
FIG. 3 is a partly sectioned schematic illustration of a hot-runner mold of the first embodiment of the invention in the closed state.

FIG. 3 shows a most primitive form of the invention obtained by developing the prior art mold as shown in FIGS. 1 and 2. Namely, the hot-runner mold of the first embodiment as shown in FIG. 3 differs from the illustrated prior art mold almost only in that it is provided with a gate-temperature recovering block.

More specifically, referring to FIG. 3, a hot-runner block consists of a hot sprue bush 10a and a hot-runner block body 10. The hot sprue bush 10a is connected and fixed through a fixing block 4 to a stationary-side die plate 2 of an injection molding machine. A moving-side cavity block 20 is fixed to a moving-side die plate of the injection molding machine through a suitable structural members, while a stationary-side cavity block 20a is disposed between the moving-side cavity block 20 and the fixing block 4. An opening device 6 disposed between the stationary-side cavity block 20a and the fixing block 4 is adapted to bias these members away from each other. The stroke over which these two members are movable away from each other is limited by a stopper 7.

A molten resin supply port 11 is formed to open in one end of the hot sprue bush 10a of the hot-runner block, through which the molten resin, i.e. the molding material, which has been injected from the nozzle of the injection molding machine is made to pass.

A sprue 12a through which the molten resin is made to pass leads from the molten resin supply port 11 and extends in the direction in which the movable part of the mold is moved for opening and closing of the mold.

The hot-runner block body 10 is a structure which extends in the direction normal to the above mentioned direction in which the movable part of the mold is moved, and has tow parallel and opposing gate opening surfaces 15. A plurality of gates 13 are disposed to open in each gate opening surfaces 15, along the length of the hot-runner block body 10. These gates are in communication with a main runner 12b which extends in the longitudinal direction of the hot-runner block body 10 through respective sub-runner 12c. The main runner 12b crosses the main sprue 12a. Means 14 embedded in a portion of the hot-runner body 10 are adapted to heat the body 10, so that the resin in the latter may flow at least at the time of injection. Needless to say, heating means may be provided in the sprue bush 10a are required.

The moving side cavity block 20 is provided with two opposing contacting surfaces 25 which are adapted to contact respective gate opening surfaces 15 of the hot-runner block body 10 at least in the closed state of the mold. Cavities 21 are formed adjacent to the parting surface 23 of the cavity block 20. These cavities have respective molten resin pouring ports 21a which open in the contacting surfaces at portions of the latter corresponding to the positions of the gates 13.

The stationary-side cavity block 20a has two opposing contacting surfaces 25a adapted to contact respective gate opening surfaces 15 of the hot-runner block.

Gate-temperature recovering blocks 30 are disposed at suitable portions on the stationary-side cavity block 20a, such that their contacting surfaces 35 occupy the same planes as corresponding contacting surfaces 25a of the stationary-side cavity block 20a.

Thus, the gate opening surfaces 15, the contacting surfaces 25 of the moving-side cavity block 20, the contacting surfaces 25a of the stationary-side cavity block 20a and the contacting surfaces 35 of the gate-temperature recovering blocks are disposed to extend in the direction in which the movable part of the mold is moved.

The stationary-side and the moving-side cavity blocks 20a, 20 are provided respectively with conduits or passages 24a, 24 of the cooling water, intended for maintaining these cavity blocks at a temperature low enough to cause the solidification of the resin.

In the opened state of the mold as shown in FIG. 3, the stationary cavity block 20a is kept at a position away from the fixing block 4 by a distance which is limited by the stopper 7. In this state, the gate opening surfaces 15 of the hot-runner block are held at a position for contacting the gate-temperature recovering blocks 30. Consequently, a uniform temperature distribution is established around the gates, because of the heat input from the gate-temperature recovering blocks 30 or, even if such a heat input cannot be expected, a suppression of heat radiation from the gate area due to the presence of the gate-temperature recovering blocks 30, while a continuous heat input is made to the gate area from other portions of the hot-runner block. Consequently, a temperature sufficinetly high to ensure the injection or flowing of the resin is recovered at the area around the gates 13. The moving-side die plate of the injection molding machine is moved in this condition, so as to close the mold.

More specifically, at first the parting surface 23 of the moving-side cavity block 20 is brought into contact with the parting surface 23a of the stationary-side cavity block 20a. Then a mold closing device presses the stationary-side cavity block 20a toward the fixing block 5 until the block 20a comes into contact with the block 4, overcoming the biasing force of the mold opening means 6, thereby to completely close the mold. During this closing operation of the mold, the gate opeing surfaces 15 are moved relatively to the gate-temperature recovering blocks 30, as a result of the movement of the stationary-side cavity block 20a. At the same time, the gates 13 are moved relatively to the cavity blocks, so that the gate opening surfaceds 15 clear the gate-temperature recovering blocks 30 and is brought into contact with the contacting surfaces 25, 25a of the cavity blocks. Finally, the gates 13 are brought into alignment with corresponding molten resin pouring ports 21a.

The injection of the molten resin is started immediately after the completion of closing of the mold. Namely, at the instant when the closing of the mold is completed, the gate opening surfaces 15 are already in contact with the cold cavity blocks and, accordingly, the temperature of the gate area starts to decrease incurring the solidification of the resin in that area. It is therefore necessary to start the injection well before the solidification becomes serious. As is experienced in the ordinary injection molding process, the continuous flow of the resin is maintained, once it is started, even if the temperature around the gate area is lowered considerably.

As the molding cavities 21 are all filled with the resin, the flow of the resin is ceased and the solidification of the same is commenced.

At this moment of starting of the solidification, no further flow of the molten resin and, accordingly, no inejction pressure is necessary. That is, the injection step is over. Then, the next step of cooling is started, in which the molten resin filling the molding cavities 21 and now relieved from the injection pressure is sufficiently cooled. During this cooling step, the injection molding machine itself functions an operation for preparing the next batch of resin, i.e. an operation so-called plasticization.

The opening of the mold is commenced upon completion of the cooling step. This opening operation is started with a simultaneous and unitary movement of both cavity blocks 20, 20a, caused by the mold opening means 6. Consequently, the solidified resin is severed or sheared at portions of the latter between the gates 13 and the molten resin pouring ports 21a, so that the molded articles are separated from the so-called runner portions. The stopper 7 comes to effect to stop the movement of the stationary-side cavity block 20a, after the gate opening surfaces 15 have been brought to the predetermined positions at which they contact the corresponding contacting surfaces 35 of the gate-temperature recovering blocks 30. Then, the parting surfaces 23 and 23a are made apart, and the molded articles are ejected. After the ejection of the molded articles, the moving-side cavity block 20 is made to stop, thus completing one cycle of molding process.

In the molding process as stated above, it is critical that the solidification of the resin is commenced at the early step of the injection, so as to hinder the free flowing of the injected molten resin. According to the result of a test conducted by the inventors, the dimensional or weight stability or uniformity of the molded articles is very much improved by allowing the solidification to start at the early step of injection, as compared with the case in which the molten resin is relieved from the injection pressure while it still has a large fluidity.

The starting of the solidification at the early step of injection, as performed in the molding system of the invention, can be no means effected by the conventional mold construction as shown in FIGS. 1 and 2. It will be clear to those skilled in the art that such an early solidification in the conventional molding system is not allowed, because such a conventional system lacks the means for melting the solidified resin in the gate area, so that the gates will be clogged once the solidification of the resin is allowed in the gate area, so as to seriously hinder the next batch of injection.

Hereinafter, the practical form of the embodiment of the invention will be described in more detail.

Referring first to the gate-temperature recovering block 30 which constitutes one of the essential features of the invention, the block 30 is intended, as stated before, to perform a function to recover the sufficiently high temperature of the gate area upon contact with the latter, the temperature of the gate area has been lowered due to the previous contact of that area with the cold cavity blocks. For this reason, the gate-temperature block 30 is made of a heat insulating material which is less likely to transfer the heat than the material of the cavity blocks, e.g. asbestos, ceramics, heat-resistant plastics or porous material, or, alternatively, made to have a temperature higher than that of the cavity blocks.

Inventors have confirmed that the former way of composing the gate-temperature recovering block 30 with a heat insulating material is practical and acceptable enough. However, it is preferred and recommended that the gate-temperature recovering block is made of a composite material in the form of thin (about 1 μm−1 mm) film of a metal on the sliding surface of the heat insulating material, for a compatibility of the improved durability and the superior temperature recovery of the gate area. Although not detailed here, various forms of the gate-temperature recovering block made of composite materials inlcuding various heat insulating materials are possible.

The latter mentioned way of keeping the gate-temperature recovering block at a temperature higher than that of the cavity blocks is more positive. Namely, the desired advantageous effect is obtainable by providing the gate-temperature recovering block 30 with its own heating means, such that the temperature of the block 30 is maintained at least higher than the temperature of the cavity blocks. Clearly, the temperature recovering performance will be much increased by maintaining the temperature of the gate-temperature recovering block 30 substantially equal to or higher than the predetermined temperature to which the hot-runner block is heated. A stable and uniform molding of the articles will be further ensured by providing means for preserving a constant high temperature of the gate-temperature recovering block 30.

Known measures including an electric heating, circulation of a hot heating medium or heat pipes may be used as the means for heating the gate-temperature recovering block 30. These measures also afford easy temperature control for maintaining the constant high temperature of the gate-temperature recovering block.

The capability for recovering the high temperature of the gate area is increased, as stated before, through making the temperature of the gate-temperature recovering block itself sufficiently high. However, an excessively high temperature of that block will cause various inconveniences such as degradation of the resin and the like.

For enhancing the temperature recovery effect without causing the excessive heating of the gate-temperature recovering block, it is suggested that the block is made of a material having a good heat conductivity and, for a larger heat capacity, large specific heat and specific weight.

From this point of view, copper or its alloy is preferably used as the material of the gate-temperature recovering block, although other metals are generally acceptable.

For further ensuring the good temperature recovery around the gates of the hot-runner block, means are preferably used for pressing the gate area of the hot-runner block against the gate-temperature recovering block, when they are brought into mutual contact.

More specifically, referring to FIG. 3, supposing that two gate-temperature recovering blocks 30 are mounted to oppose to each other as illustrated on the stationary-side cavity block 20a, the condition of the mutual contact of the gate opening surfaces 15 and the corresponding contacting surfaces 35 of the blocks 30 depends on the state of fitting of the blocks 30 and the block 20a which in turn is determined by the relationship between the distance of one contacting surface 35 from the other and the distance of one gate opening surface 15 from the other. The optimum fitting condition is theoretically obtainable, but practically such a critical condition is often failed due to the thermal expansions of the members and/or practical limit of precision of the mechanical processing. Consequently, the fitting may become excessively tight to hinder the smooth movement or, to the contrary, the fitting may become too loose to cause an insufficient contact of the members.

This problem will fairly be avoided by mounting at least one of the gate-temperature recovering block 30 movably in the direction normal to the contacting surface 35 by a predetermined stroke and providing biasing means such as a spring. This arrangement will be most broadly expressed by "means for resiliently biasing the gate-temperature recovering block or blocks into contact with the hot-runner block". This means can be used not only in the embodiment as shown in FIG. 3, but also in other preferred forms of the invention.

The foregoing description has been made mainly in connection with the temperature recovering performance of the gate-temperature recovering block in recovering the desired high temperature of the gate area.

Beside the described temperature recovering effect, the gate-temperature recovering block can play an additional role of preventing the molten resin from leaking. It will be understood that the leak of the molten resin from gates 13 is avoided by making the gate-temperature recovering blocks contact the gate opening surfaces of the hot-runner block and close the gate openings.

Needless to say, it is preferred to provide a heat insulating layer of air or other heat insulating material between the gate-temperature recovering block and the structure on which the block is mounted, which one of the described types of the gate-temperature recovering block may be used.

Hereinafter, a description will be made as to the movement of the hot-runner block and the cavity blocks relative to each other.

The whole construction of the mold will be highly simplified, by adopting such an arrangement as to cause the movement of the hot-runner block relative to the cavity block by the operation of the injection molding machine for opening and closing the mold, as is the case of the embodiment of FIG. 3. Generally speaking, the cavity block assembly is so constructed as to be separated or devided into at least two parts, the movable and stationary parts, in order to facilitate the separation of the molded articles from the mold. There is also a case where the cavity block assembly is divided into more than three parts in order to adopt to the complicated shape of the molded articles, or when it is required to adopt a suitable ejecting system for the molded articles. Explaining about a case where the cavity block assembly is divided into two parts, it is possible and preferred to make the hot-runner block movable relatively to the moving and stationary-sides cavity blocks accompanying the opening and closing operation of the mold, by adopting such an arrangement that the hot-runner block is fixed through a fixing block to one of the pair of die plates of the injection molding machine, and the stationary-side cavity block is connected to the fixing block for a free movement by a predetermined stroke in the direction of opening and closing movement of the mold relatively to the fixing block, while the moving-side cavity block is fixed to the other die plate of the injection molding machine. The fixing block as used in this arrangement is nothing but an intermediate connecting member for fixing the mold to a die plate of the injection molding machine and, therefore, can be dispensed with. Thus, a typical arrnagement has been described, by way of example, as including the fixing block.

It is advantageous and, accordingly, preferred that the movement of the hot-runner block into and out of contact with the gate-temperature recovering blocks is made in relation to or caused by the movement of the hot-runner block relative to the cavity blocks which in turn is preferably made in relation to the opening and closing motion of the mold. To this end, the gate-temperature recovering block is mounted on preselected portions of the stationary-side cavity block or of a structural member which can be regarded as being materially unitary with the latter. By doing so, the gate area of the hot-runner block is brought into contact with the gate-temperature recovering blocks when the mold is opened. At the same time, as the mold is closed, a relative movement is caused between the hot-runner block and the gate-temperature recovering block, in accordance with the movement of the stationary-side cavity block relative to the hot-runner block, so that the gate area of the hot-runner block can leave the gate-temperature recovering blocks.

A practical arrangement of the connection between the stationary-side cavity block and the fixing block, for achieving the above explained relative movement, has a stopper adapted to limit the stroke of the relative movement of the fixing block relative to the stationary-side cavity block such that, when these two members are positioned away from each other by the largest distance allowed by the stopper, the gate-temperature recovering blocks are made to contact the preselected portions of the hot-runner block around the gates, and suitable opening means adapted to exert a force to bias these two members away from each other.

The major part of the force exerted by the opening means for moving these two members away from each other is consumed away in shearing the parts of the resin solidified between the gates of the runner block and the corresponding molten resin pouring ports of the cavity block. Some part of the force is used to overcome the frictional resistance appearing in every sliding parts.

The opening means may be practically constituted by a spring, for a simpler construction of the whole molding system. However, when the opening means has to exert a large force over a long stroke, it is preferably constituted by a hydraulic cylinder or a pneumatic cylinder.

As has been stated, it is advantageous and preferred that the movement of the hot-runner block and the cavity blocks (or the gate-temperature recovering blocks) relative to each other is effected by the opening and closing motion of the mold, from a view point of simplification of the whole molding system, and the practical example of such an arrangement has been already described in relation to FIG. 3.

However, in the arrangement as shown in FIG. 3, the mutual contact of the gate area of the hot-runner block and the gate-temperature recovering blocks is maintained over only a small part of the period in which the mold is kept opened, so that the recovery of the desired high temperature at the gate area may be failed in some cases.

In order to improve this situation, it is proposed to provide a means for effecting the relative movement between the hot-runner block and the cavity blocks independently of the opening and closing motion of the mold, such that the hot-runner block is moved relatively to the cavity blocks so as to bring the gate area of the hot-runner block out of the contact with the cavity blocks into contact with the gate-temperature recovering block, in advance to the opening of the mold. Practically, it is not essential that the gates of the hot-runner block are kept in alignment with the molten resin pouring ports of the cavity block, after the completion of the injection step. It is therefore possible to initiate the aforesaid relative movement at this stage, i.e. after the completion of the injection step and before the opening of the mold. The aforementioned effect will be obtained if the relative movement is started immediately before the commencement of the opening of the mold.

To obtain the above described operation in the simplest way, it is preferable to mount the hot-runner block on a fixing block connected to one of the pair of die blocks of the injection molding machine, in such a manner that the hot-runner block can be moved irrespective of the opening and closing motion of the mold. The fixing block as used in this arrangement is not a specific structure but is a mere connecting member for connecting the mold to the die plate and, therefore, may be dispensed with or, alternatively, integral or the same body as the stationary-side cavity block.

Figure 4:
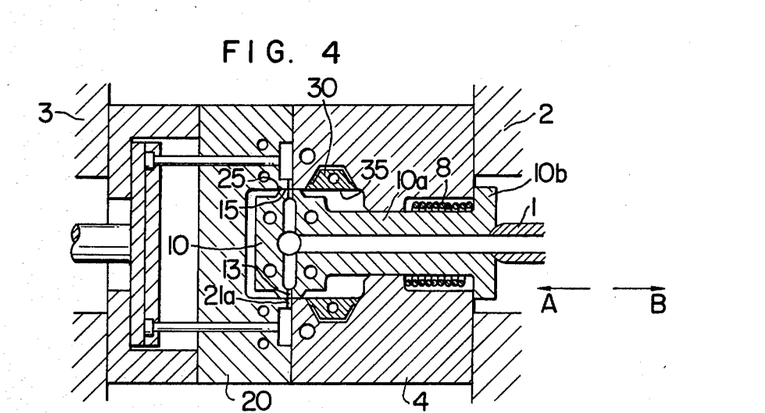
FIG. 4 is a schematic sectional view of another embodiment of the invention in the closed condition.
Figure 5:
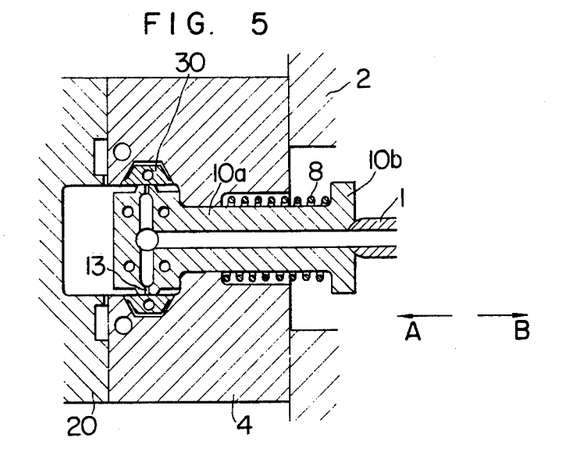
FIG. 5 is a view similar to that of FIG. 5, showing the mold in the closed state but not stationed for the injection.

FIGS. 4 and 5 show a preferred embodiment of the hot-runner mold basically constructed in accordance with above explained principle. Referring to these Figures, a fixing block 4, which is integral with the stationary-side cavity block, is fixed to the stationary-side die plate 2 of the injection molding machine, while the moving-side cavity block 20 is connected to the moving-side die plate 3 of the injection molding machine, through a suitable intermediate structural members.

The nozzle 1 of the injection molding machine is movable in the directions of arrows A and B, and is contacted by one end of the hot sprue bush 10a of the hot-runner block. The hot sprue bush 10a passes through the fixing block 4 for a movement in the directions of the arrows A and B, relatively to the fixing block 4, within a predetermined stroke. A biasing means 8 is disposed between the fixing block 4 and the hot sprue bush 10a, so as to bias the latter in the direction of the arrow B, i.e. into contact with the nozzle 1.

The hot sprue bush 10a is provided with a flange 10b adapted to abut a portion of the fixing block 4. The arrangement is such that the gates 13 formed in the hot-runner block body 10 are in alignment with the molten resin pouring ports 21a formed in the moving-side cavity block 20, when the hot sprue bush 10a has been moved to bring its flange 10b into contact with the aforementioned portion of the fixing block 4.

According to this arrangement, the nozzle 1 moves in the direction of the arrow A, overcoming the force of the biasing means 8, so that the sprue bush 10a is positioned to keep its flange 10b in contact with the fixing block 4, as shown in FIG. 4, during the injection. Then, after the completion of the injection, the hot-runner block is moved back by the biasing means 8, so as to follow the movement of the nozzle 1 as the latter is retracted in the direction of the arrow B, so that the gates 13 are moved out of the alignment with the molten resin pouring ports 21a. Finally, the hot-runner block is moved to such a position as to make its gate opening surfaces 15 contact the contacting surfaces 35 of the gate-temperature recovering blocks 30 which are mounted on suitable portions of the fixing block 4, i.e. to the position as shown in FIG. 5. The movement of the hot-runner block in the direction of the arrow B is ceased when the latter comes to collide with the fixing block 4.

In the illustrated embodiment, the movement of the hot-runner block depends on the movement of the nozzle of the injection molding machine. However, this arrangement is not essential nor critical. For instance the contact of the hot-runner block with the nozzle may be slidable or rotatable, and the means for causing the movement of the hot-runner block can be suitably selected in accordance with the manner of this contact.

Nowadays, it has become quite a common measure to make the nozzle of the injection molding machine movable within a desired range, so that the machine may be combined with various types of molds or molding methods. Thus, it is possible to make use of the movement of the nozzle in the similar manner to the utilization of the mold movement.

It is therefore possible to effectively simplify the whole structure through making use of the movement of the nozzle of the injection molding machine as the source of the driving force for causing the relative movement between the hot-runner block and the fixing block (this fixing block may be materially the same body as one of the cavity blocks). From the view point of simplification of the mold construction, it is preferred to fix the hot-runner block to the nozzle of the injection molding machine, while the nozzle is allowed to move within a predetermined range of movement. This arrangement however poses a problem that it is quite difficult to connect the hot-runner block to the nozzle, in attaching the mold to the injection molding machine.

To eliminate this problem, it is preferred to dispose a means for resiliently pressing the hot-runner block onto the nozzle, between the hot-runner block and the fixing block or an equivalent part of the mold. This means can be constituted most simply by a spring. However, when an extremely large force is required, a hydraulic cylinder or a pneumatic cylinder is advantageously used.

Needless to say, in order to eliminate unnecessary parts of the mold, it is preferred that the movement of the gate area of the hot-runner block to and from the gate-temperature recovering blocks is effected by the relative movement between the hot-runner block and the cavity blocks, even when the relative movement is made independently of the opening and closing motion of the mold.

To this end, the gate-temperature recovering blocks are mounted on the fixing block or an equivalent part of the mold, so that the gate area of the hot-runner block may be brought into and out of the contact with the gate-temperature recovering block, in accordance with the movement of the hot-runner block relative to the cavity blocks.

Hereinafter, a description will be made as to the forms of the hot-runner block itself and the forms of mutual contact of the hot-runner block and the cavity blocks. In the embodiment as shown in FIG. 3, the contact of the hot-runner block and the cavity blocks is such that the gate opening surfaces and the surfaces in which the molten resin pouring ports open are allowed to contact at least at the time of injection. At the same time, these surfaces extend in the direction of the relative movement between the hot-runner block and the cavity blocks. This form of contact offers an advantage that the severing of the solidified resin at portions between the gates and the molten resin pouring ports, as a result of the movement of the hot-runner block relatively to the cavity blocks after a predetermined time from the completion of the injection, is made as a perfect shearing, so that the severing is made uniformly over the all articles, so as to ensure the dimensional precision or uniformity of the articles.

Figure 8:
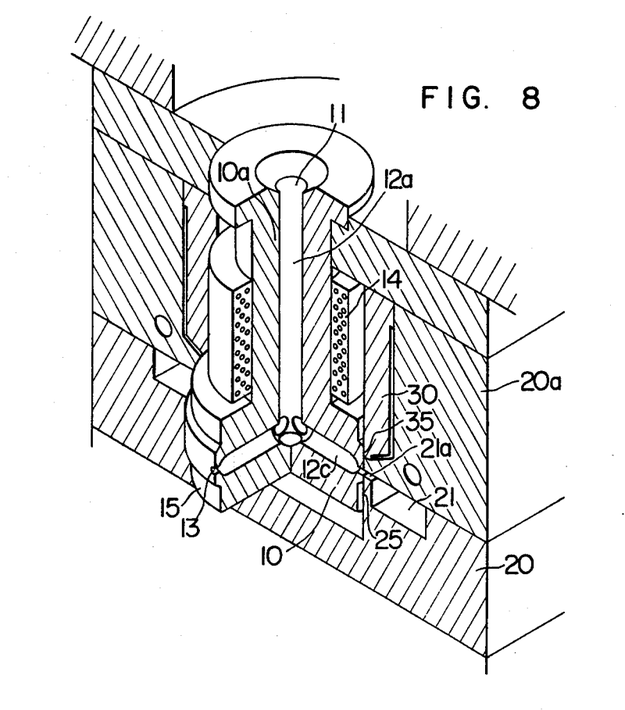
FIG. 8 is a schematic illustration of still another embodiment of the invention in the closed state.

Even if the gate opening surfaces, as well as the surfaces in which the molten resin pouring ports open, extend in the direction of the relative movement between the hot-runner block and the cavity blocks, it does not always mean that these surfaces are planes as shown in FIG. 3, but may be cylindrical as is in the embodiment as shown in FIG. 8.

More specifically, referring to FIG. 8, the hot-runner block has a hot-runner block body 10 which has a cylindrical form having its axis extended in the direction of the opening and closing direction of the mold. A plurality of gates open in the peripheral surface of the cylindrical hot-runner block body which constitutes the gate opening surface 15. The gate-temperature recovering block 30 mounted on the stationary-side cavity block 20a has a cylindrical contacting surface 35 adapted to contact the cylindrical gate-opening surface 15. The moving-side cavity block 20 has a cylindrical contacting surface 25 adapted to contact the cylindrical gate opening surface of the hot-runner block and in which opened are the molten resin pouring ports 21a so as to become aligned with the gates at the time of injection.

At the time of injection, the gate opening surface 15 is put into contact with the surface 25 in which the molten resin pouring ports are opened, and then the hot-runner block is moved relatively to the cavity blocks in the direction of opening and closing movement of the mold, so that the gates 13 and the molten resin pouring ports are displaced from each other, thereby to shear the solidified resin therebetween. Finally, the gate opening surface 15 is brought into contact with the contacting surface of the gate-temperature recovering block 30.

The described arrangement of the gate opening surface and the molten resin pouring port opening surface well meets the requisite that these surfaces have to extend in the direction of the relative movement of the hot-runner block and the cavity blocks to each other. In addition, this arrangement affords an advantage of easier processing of the hot-runner block, because the latter is cylindrical and offers another advantage that the larger number of gates can be arranged on the limited gate opening surface to afford a simultaneous molding of a large number of articles.

An entirely different kind of advantage is brought about, when the arrangement is such that the gate opening surface of the hot-runner block and the contacting surface of the cavity block contact each other at the time of injection but these surfaces are extending at an angle which may be a right angle, to the direction of relative movement between the hot-runner block and the cavity blocks.

Namely, in such a case, the aforementioned molten resin pouring ports are materially or completely dispensed with, so that the molded products are almost or completely devoid of unnecessary appendix, as will be understood from the following description.

Namely, assuming that the material or body of the molten resin pouring ports has been eliminated from the foregoing emboidments in which the gate opening surface and the cooperating contacting surfaces extend in the direction of the relative movement between the hot-runner block and the cavity block, then the gate openings themselves will constitute a part of respective one of the molding cavities. In such a case, the surfaces of the molded articles will be scratched by the gate opening surface, as the hot-runner block moves relatively to the cavity block. However, provided that these surfaces are extending at an angle, which may be a right angle, to the direction of the aforesaid relative movement, the scratching of the surfaces of the molded articles by the gate opening surface is less likely to occur.

Figure 6:
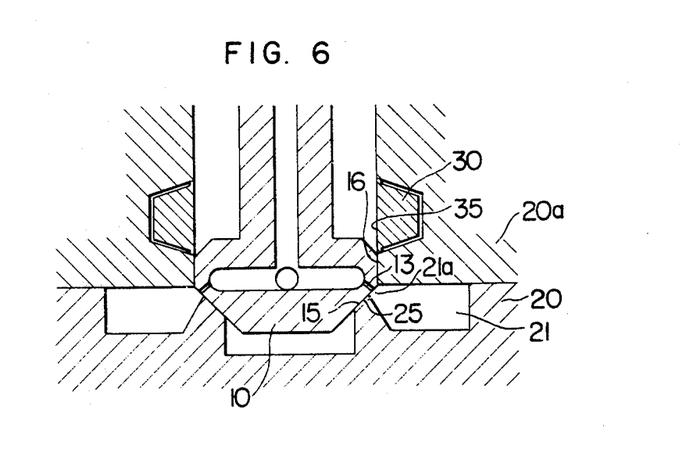
FIG. 6 is a schematic longitudinal sectional view of still another embodiment in the closed condition.
Figure 7:
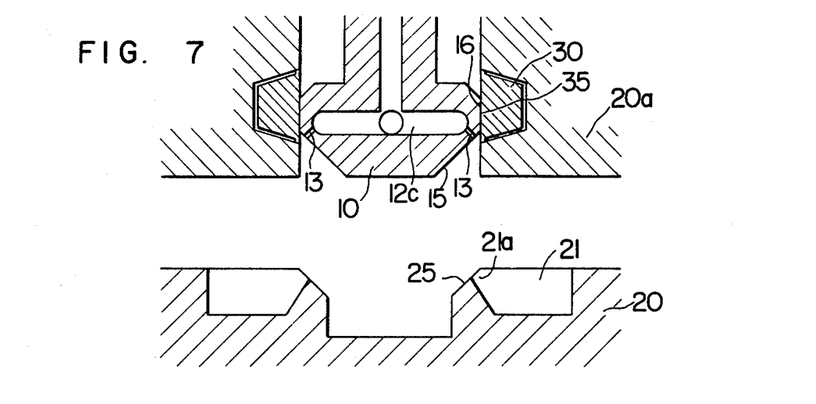
FIG. 7 is a view similar to that of FIG. 6 but showing the mold in the closed state.

FIGS. 6 and 7 show an example of the mold construction in which the gate opening surface and the contacting surface in which the molten resin pouring ports open are arranged at an angle to the direction of the aforesaid relative movement.

More specifically, referring to FIGS. 6 and 7, the hot-runner block has a body 10 the longitudinal sides of which extend in the direction normal to the plane of the drawings. The longitudinal sides of the body 10 extend also at a right angle to the direction of the opening and closing motion of the mold. The hot-runner block body 10 has a pair of gate opening surfaces 15 which extend along the length of the body 10 and at inclinations to the direction of opening and closing motion of the mold. At the same time, the body 10 is further provided with parallel and opposing contacting surfaces 16 which extend along the length of the body 10 and in parallel with the line of opening and closing motion of the mold. In each gate opening surface 15, opened and disposed along the length of the body 10 are a plurality of gates 13. The moving-side cavity block 20 is provided with contacting surfaces 25 in which opened are a plurality of molten resin pouring ports 21a such that they may be aligned with corresponding gates 13 at the time of injection (See FIG. 5), and molding cavities 20 communicating respective molten resin pouring ports 21a. The stationary-side cavity block 20a carries the gate-temperature recovering blocks 30, such that the contacting surfaces 16 of the hot-runner block body 10 are brought into contact with respective gate-temperature recovering bodies 30 when the mold is opened or in a predetermined state as shown in FIG. 7.

The hot-runner mold under description meets the basic requisites of the invention. In addition, as will be seen from the drawings, the body of the molten resin pouring ports are materially eliminated. Thus, the molten resin pouring port in this embodiment is materially a portion of each molding cavity which faces the corresponding gate.

In the described embodiment in which the gate opening surfaces and cooperating contacting surfaces are inclined with respect to the direction of the aforementioned relative movement between the hot-runner block and the cavity block, these surfaces may be flat as illustrated or, alternatively, conical.

An arrangement of the runners similar to that of the embodiment as shown in FIG. 3 can be adopted, when these surfaces are flat. Namely, in such a case, a main runner is extended in the longitudinal direction of the hot-runner block body. The gate opening surfaces are disposed in back to back relation in parallel with the main runner. A plurality of gates open in each of the flat gate opening surfaces. Consequently, a larger number of molded articles become obtainable simultaneously, that by a hot runner block having only one gate opening surface. In addition, the balance or stability of the hot-runner block itself is much improved.

On the other hand, similar advantages to those provided by the cylindrical gate opening surface, i.e. the easy processing of the hot-runner block, is ensured by making the gate opening surface conical. At the same time, the number of articles obtainable simultaneously is conveniently increased when the gate opening surface is made conical, as is the case of the cylindrical gate opening surface.

Figure 9:
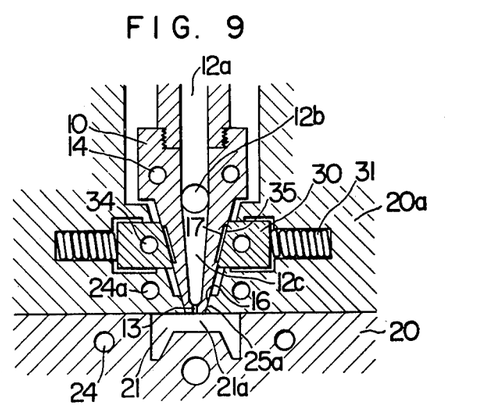
FIG. 9 is a schematic longitudinal sectional view of a further embodiment of the invention in the opened stae.
Figure 10:
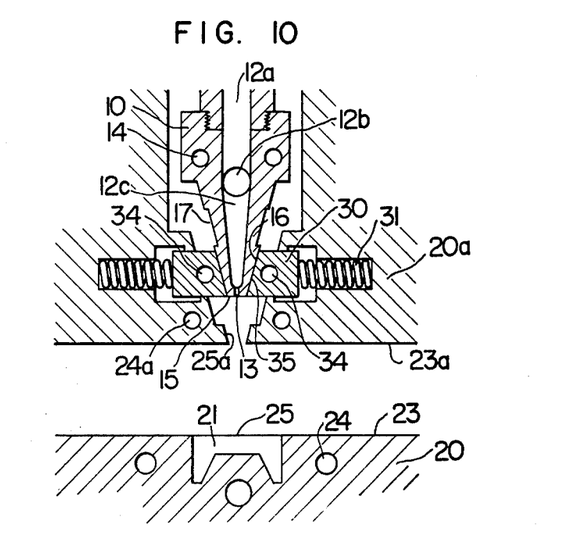
FIG. 10 is a view similar to that of FIG. 9 but shows the mold in the closed state.

FIGS. 9 and 10 show an embodiment in which the gate opening surfaces and the cooperating contacting surfaces in which the molten resin pouring ports open are made to extend at a right angle to the line of the aforesaid relative movement.

More specifically, referring to FIGS. 9 and 10, the hot-runner block has a body 10 the longitudinal sides of which extend at a right angle to the plane of the drawing and having a substantially uniform cross-section as illustrated over its entire length except a sprue 12a, branch runners 12c and gates 13. Namely, the hot-runner block body is a member whose longitudinal axis extends in the direction normal to the plane of the drawing and having therein a main runner 12b extending along the length thereof. The body 10 further has a pair of substantially flat contacting surfaces 16 which extend in parallel with the main runner 12b and which are inclined with respect to the direction of the opening and closing motion of the mold. These two contacting surfaces 16 are disposed to converge at a point below the bottom of the hot-runner block body 10. Each contacting surface 16 is partially covered with a heat insulating recess 17. The lower end of the hot-runner block body 10 constitutes a substantially flat gate opening surface 15 extending at a right angle to the direction of the opening and closing motion of the mold. A plurality of the gates 13 are formed in the hot-runner block body 10 so as to open in the gate opening surface 15 along a line. These gates 13 communicate the main runner through the respective branch runners 12c.

The stationary-side cavity block 20a is so shaped as to sandwitch the hot-runner block body 10 from both sides of the latter, and has a pair of contacting surfaces 25 which are adapted to contact the contacting surfaces 16 of the hot-runner block at least the time of injection. Two gate-temperature recovering blocks 30 are disposed at preselected portions of the cavity block 20a. Each of the gate-temperature recovering block 30 has a contacting surface 35 adapted to contact corresponding contacting surface 16 of the hot-runner block, and a heating means 34. Biasing means 31 are provided for biasing respective gate-temperature recovering blocks 30 into contact with the contacting surfaces 16. The gate-temperature recovering blocks 30 are slidably mounted on the stationary-side cavity block, so that they may be moved in the direction in which the biasing force of the biasing means 31 is exerted.

Turning now to the moving-side block 20, it has a plurality of molding cavities 21 having molten resin pouring ports corresponding to the gates of the hot-runner block. The cavity block 20 further has a surface 25 in which the aforesaid molten resin pouring ports 21a open. The surface 25 is adapted to contact the gate opening surface at least the time of injection. In the described embodiment, this surface 25 is constituted by the same surface as the parting surface 23. Thus, the surface 25 is portions of the parting surface 23 separating the adjacent cavities from each other.

In operation, during the injection in which the mold is kept closed as shown in FIG. 9, the cavities 21 are closed by both cavity blocks and by the gate opening surface 15 of the hot-runner block. At the same time, the contacting surfaces 16 of the hot-runner block are kept in contact with the contacting surfaces 25a of the stationary-side cavity block 20a, while the gate-temperature recovering blocks 30 contact the heat insulating recesses of corresponding contacting surfaces 16. Thus, the gate-temperature recovering blocks 30 are materially kept out of contact with the hot-runner block.

Then, as the mold is opened or after a predetermined time has elapsed from the completion of injection, the hot-runner block is moved relatively to both cavity blocks, in the direction of opening and closing motion of the mold, so that the gate-temperature recovering blocks 30 comes into contact with the portions of the contacting surfaces 16 in the close proximity of the gates 13.

In this embodiment, the gate opening surface and the surface in which the molten resin pouring ports open extend at a right angle to the direction of the relative movement between the hot-runner block and the cavity blocks. Consequently, the molten resin pouring ports have been eliminated materially.

In the foregoing embodiments as shown in FIGS. 3, 6 and 7, and 9 and 10, the gate opening surfaces or surface is made to contact the cooperating surfaces or surface in which the molten resin pouring ports open, at least the time of injection, and these surfaces are all substantially flat. These features offers an advantage that slight difference of the thermal expansion between the contacting surfaces are allowed thanks to the flat shape of these surfaces, and does never cause any extraordinary and uneven internal stress in the mold, and adequate contacts between the contacting surfaces are always ensured.

In the embodiments as shown in FIGS. 6, 7 and 9, 10, the gate-temperature recovering bodies are made to contact the hot-runner block at portions of the latter other than the gate opening surfaces, in the vicinity of the gates. This arrangement is quite effective and useful when used in combination with some specific forms of the hot-runner block.

This arrangement however may pose a problem so-called dolueling, i.e. leak of the molten resin from the gates, because he gates are kept not closed by the gate-temperature recovering blocks. However, this problem can fairly be avoided by arranging such that the resin material at the gate area is usually kept solidified when the gates are opened and molten again only at immediately before the commencement of next batch of injection. This critical condition is achieved by suitably selecting the heat insulating or heating capacity of the gate-temperature recovering blocks or, alternatively, by suitably selecting the time length over which the gate area of the hot-runner block is kept in contact with the gate-temperauture recovering blocks.

Hereinafter, the most advanced form of the invention will be described with specific reference to FIGS. 11 and 12. The hot-runner block body 10 of this embodiment is a block which extends two-dimensionally in the direction normal to the direction of opening and closing motion of the mold. The hot-runner block body 10 has a number of cylindrical or columnar rod-like members 18 projected therefrom in the direction of opening and closing motion of the mold. Each rod-like member 18 is devoid of its own heating means. The lower end of each rod-like member 18 constitutes the gate opening surface 15 in which opened is a sole gate 13.

The peripheral surface just above the gate opening surface is formed to have a conical shape and constitutes a conical contacting surface 19 which is connected to a cylindrical contacting surface 16. The portion of the rod-like member between the cylindrical contacting surface 16 and the hot-runner block body 10 is made to have a diameter smaller than that of the cylindrical constacting surface 16. Each gate 13 is connected through each branched runner 12c to main runner 12b which runs longitudinally and transversely of the hot-runner block body 10. The main runner 12b is communicated through a sprue 12a to the nozzle of the injection molding machine.

The stationary-side cavity block 20a has bores adapted to surround respective rod-like members 18. The bottom of each bore constitutes a conical contacting surface 25a adapted to be brought into contact with the contacting surface 19 of each rod-like member 18, at least the time of injection.

The hot-runner block body 10 itself is fixed to the fixing block 4.

The stationary-side cavity block 20a is connected to the fixing block 4, such that it is separated by a predetermined distance from the latter by the opening operation of the mold and moved closer to the latter in accordance with the closing operation of the mold.

The moving-side cavity block 20 has a plurality of molding cavities 21 having molten resin pouring ports 21a corresponding to the gates 13, and is provided with a parting surface 23 which is adapted to contact the parting surface 23a of the stationary-side cavity block 20a, when the mold is kept closed.

A carrier body 30a extends two-dimensionally parallel to the hot-runner block body 10. The carrier body 30a incorporates a heating means, and is fixed to the stationary-side cavity block 20a through a heat-insulating member 33. The carrier body 30a carries a plurality of contacting members 30b, corresponding to the rod-like members 18 of the hot-runner block body 10. Each contacting member 30b has a tubular form, the inner peripheral wall of which constitutes a contacting surface 35 shaped and dimensioned for a close contact with the contacting surface 16 of the rod-like member 18. The carrier body 30a, contacting members 30b and the heat-insulating materials 33 in combination constitutes a gate-temperature recovering block.

Figure 11:
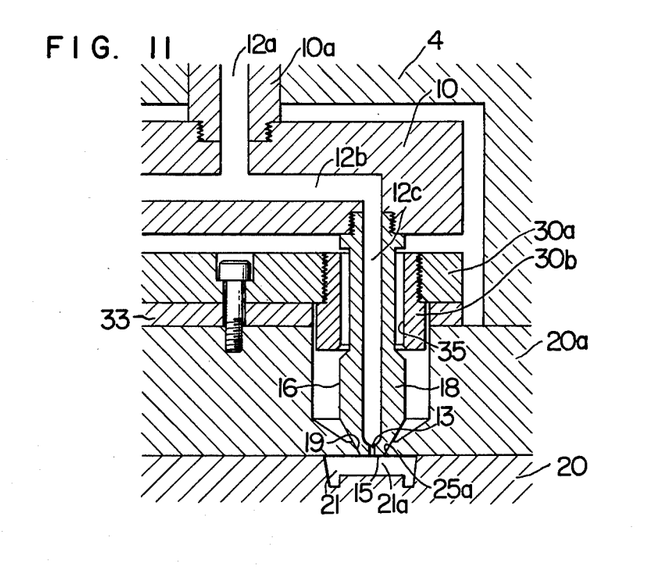
FIG. 11 is a schematic longitudinal sectional view of a still further embodiment of the invention in the opened state.

In operation, the fixing block 4 and the stationary side cavity block 20a are kept in contact with each other, and the latter 20a and the moving-side cavity block 20 are also kept in contact with each other, as shown in FIG. 11, when the mold is in the closed state. In this state, the contacting member 30b is positioned to surround the intermediate portion of reduced diameter of each rod-like member 18, so that the latter is not contacted by the gate-temperature recovering block, while the contacting surface 19 around the gate of each rod-like member 18 is kept in contact with corresponding contacting surface 25a of the stationary-side cavity block 20a.

The opening of the mold is started with the separation of the fixing block 4 from the stationary-side cavity block 20a. Consequently, the contacting surface 19 of each rod-like member 18 is disconnected from the contacting surface 25a of the stationary-side cavity block, and the contacting surface 16 of each rod-like member 18 is moved into contact with the contacting surface 35 of the corresponding contacting member 30b. Finally, the mold is opened to assume the state as shown in FIG. 12.

One of the characteristic features of this arrangement resides in that a plurality of rod-like members projecting in the direction of the aforesaid relative movement between the cavity block and the hotrunner block constitute a part of the hot-runner block, and that each gate is formed at the end of each rod-like member. This remarkably enhanced the degree of freeness of arrangement of cavities. At the same time, the heat input to the molding cavities is conveniently minimized, because the contact of the cavity block and the hot-runner block with each other is made through the end portions of the rod-like members the thermal inertia of which is sufficiently small, so as to ensure a good molding, i.e. good cooling and solidification of the resin. Besides, the recovery of the high temperature of the gate area, upon contact with the gate-temperature recovering block, is achieved in a shorter time. This characteristic feature of the superior heat balance is proved by the fact that the mold can functions satisfactorily, without the provision of specific means for maintaining the gate area at a constant high temperature.

The second characteristic feature resides in that each rod-like member 18 has an intermediate portion of a reduced diameter, i.e. the end or end portion of the rod-like member at which the gate is disposed is made to a specifically large diameter than other portions of the rod-like member, so that the gate-temperature recovering block may be positioned to confront the intermediate portion of reduced diameter of the rod-like member at least the time of injection, and brought into contact with the gate area of the rod-like member only after the latter has left the molten resin pouring port of the cavity block. Thus, this arrangement shows an effective and practical construction which affords a prompt recovery of the high temperature of the gate area of the rod-like member, which has been cooled through a previous contact with the cold cavity block.

Hereinafter, a description will be made as to possible forms of the rod-like member of the hot-runner block and the gate-temperature recovering block, as well as to the forms of mutual contact of the rod-like member and the gate-temperature recovering block.

Referring again to the aforesaid second characteristic feature of this embodiment, a superior contact between the rod-like member and the gate-temperature recovering block will be obtained by arranging such that the rod-like member of the hot-runner block has such an inversed conical peripheral surface as having a diameter which increases as it gets closer to the bottom end of the rod-like member at which the gate is provided, and that the contacting area of the gate-temperature recovering block is made to have a corresponding inversed conical inner peripheral contacting surface.

However, this type of mutual contact is achieved only through a highly precise position control of the hot-runner block relative to the gate-temperature recovering block, for otherwise the mutual contact may be rendered insufficient or, to the contrary, too strong to incur a breakage of one of these two mutually contacting members. It is remarkable that the precision requirement is released and the breakage of the members are avoided by adopting a resilient contact between the rod-like member and the gate-temperature recovering block.

This resilient contact is achieved by arranging such that the gate-temperature recovering block consists of a carrier body and contacting members carried by the carrier body, through a medium of suitable biasing means such as springs, for free movement on the carrier member in the direction of the relative movement of the hot-runner block to the gate-temperature recovering block, so that the contacting members may be resiliently pressed onto the corresponding rod-like members.

Figure 13:
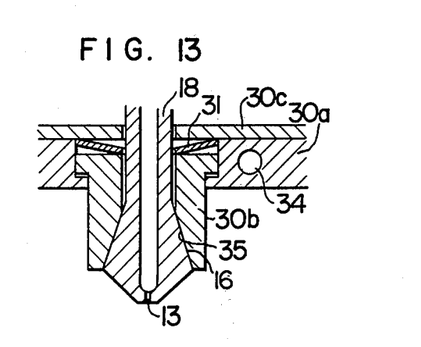
FIG. 13 is a schematic sectional view of a still further embodiment of the invention in the state not stationed for the injection.

A practical form of this embodiment is shown in FIG. 13.

A carrier member 30a having therein a heating means 34 is provided with stepped bores each of which is adapted to receive corresponding contacting member 30b. The contacting member has a generally cylindrical shape and is provided with a flange adapted to be retained by the step of the bore. A biasing means such as a leaf spring 31 is disposed behind the contacting member 30b which in turn is retained by a retaining member 30c. Consequently, the contacting member 30b is held resiliently movably relatively to the carrier member 30a within a limited stroke.

A rod-like member 18 annexed to the hot-runner block is movably received by the bore of the contacting member 30b. The rod-like member has such an inversed conical peripheral surface that its diameter becomes larger as it gets closer to the bottom end of the rod-like member where the gate 13 is disposed. This inversed conical peripheral surface constitutes the contacting surface 16 of the rod-like member 18. The bore of the contacting member 30b has an inner peripheral surface, a part of which is shaped in an inversed conical form which well meets the inversed conical contacting surface 16 of the rod-like member 18. This inversed conical inner peripheral surface of the contacting member 30b constitutes the contacting surface 35 of the latter. The diameter of the bore of the contacting member 30b is needless to say large enough to clear the other portion than the contacting surface 16 of the rod-like member 18. According to this arrangement, a slight fluctuation of the position of the rod-like member 18 at which it comes to contact the contacting member 30b is absorbed and allowed by the resilient nature of the contact, thereby to ensure the aforementioned advantageous effect.

Figure 12:
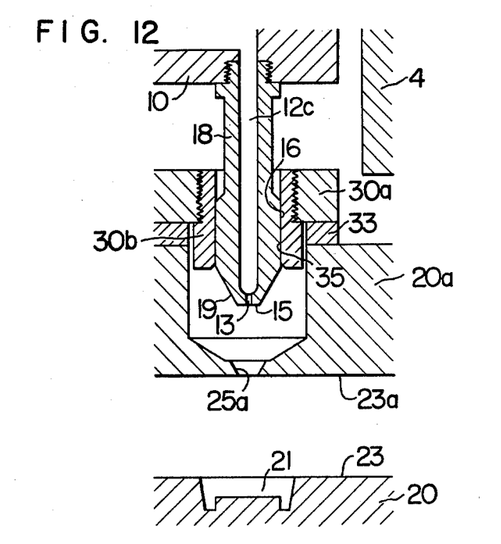
FIG. 12 is a view similar to that of FIG. 11 but showing the mold in the closed state.

A stable mutual contact of the rod-like body and the gate-temperature recovering block is also obtainable with the form of the rod-like member 18 as shown in FIGS. 11 and 12. More specifically, in the arrangement as shown in FIGS. 11 and 12, the mutual contact of the rod-like member and the gate-temperature recovering block is made through a radial contact between the inner peripheral cylindrical surface of a bore and an outer peripheral cylindrical surface of a cylindrical body. This arrangement is not suitable for ensuring a stable mutual contact. This arrangement may be however modified such that the stable mutual contact is obtained by a resilient engagement of these two surfaces.

To this end, the portion of the gate-temperature recovering block adapted for contact with the rod-like member is made to project radially inwardly, i.e. to have a reduced inner diameter. The radially inwardly projected part are provided with suitable slits which extend in the axial direction of the rod-like member. In operation, the rod-like member is driven forcibly into contact with the radially inwardly projected portion of the gate-temperature recovering block, in such a manner as to forcibly spread the slits, thereby to attain a stable mutual contact.

In the embodiment as shown in FIGS. 11 and 12, the rod-like members of the hot-runner block have to be received or contacted correctly by corresponding contacting members which are fixed to the carrier member of the gate-temperature recovering block. To this end, the contacting members have to be highly precisely located on the carrier member, so that they may be precisely aligned with the corresponding rod-like member. However, such a work of locating and attaching the contacting members at the high precision is extremely difficult to perform. In addition, the precision is likely to be lost by a possible thermal expansions of the associated members.

This problem can be however fairly overcome by connecting the contacting members to the carrier member relatively movably to the latter.

The direction of the desired relative movement is usually normal to the direction of the relative movement between the gate-temperature recovering block and the hot-runner block. Thus, the gate-temperature recovering block preferably consists of a carrier member and contacting members adapted to contact corresponding rod-like members of the hot-runner block, the contacting members being connected to the carrier member for free relative movement to the latter, in the direction or directions normal to the direction of relative movement between the gate-temperature recovering block and the hot-runner block.

From the foregoing description, it will be seen that the invention can be carried out through various preferred forms each of which having the described advantages peculiar thereto.

Consequently, the advantages offered by the present invention can be summarized as follows.

These advantages are: applicableness to various forms of articles thanks to the various possible and preferred forms of the invention, good aptitude to the simultaneous production of a large number of articles, easy handling ensured by reliable functioning, reasonable cost of manufacture afforded by the relatively simple construction and so forth.

What is claimed is:

1. A hot-runner mold comprising:
    a hot-runner block having means for maintaining a predetermined high temperature of said hot-running block, a molten resin supply port, gates and molten resin passages through which said gates are communicated with said molten resin supply port;
    a cavity block having a contact surface which is contacted by said gates and having means for maintaining a predetermined low temperature of said cavity block and molding cavities having respective molten resin pouring ports; and
    a gate-temperature recovering block positioned within said cavity block such that a portion of its surface lies in the same plane as said contact surface of said cavity block, said gate-temperature recovery block having a heating means disposed therein, said heating means being capable of maintaining a higher temperature than the temperature of said cavity block, said gate temperature recovery block functioning to recover a predetermined high temperature at said gates, upon contacting the portion of said hot-runner block around said gates;
    wherein said hot-runner block and said cavity block are movable relative to each other such that, at least during the injection, said gates of said hot-runner block and said molten resin pouring ports of said cavity block are brought into alignment with each other and, after the completion of the injection, said gates and said molten resin pouring ports are moved relatively away from each other, while said gate-temperature recovering block is put into contact with said portion of said hot-runner block around said gates, over at least a portion of the period in which said gates and said molten resin pouring ports are kept away from each other.

2. A hot-runner mold as claimed in claim 1, characterized by comprising a means for effecting said relative movement of said hot-runner block and said cavity block to each other, independently of the opening and closing operation of said mold.

3. A hot-runner mold as claimed in claim 2, wherein said hot-runner block is carried by a fixing block movably irrespective of the opening and closing operation of said mold, said fixing block being fixed to one of a pair of die plates of an injection molding machine.

4. A hot-runner mold as claimed in claim 3, wherein the relative movement of said hot-runner block and said fixing block to each other is effected by a movement of a nozzle of said injection molding machine.

5. A hot-runner mold as claimed in claim 4, characterized in that said hot-runner block is fixed to said nozzle of said injection molding machine.

6. A hot-runner mold as claimed in claim 4, characterized by further having means for biasing said hot-runner block into contact with said nozzle of said injection molding machine.

7. A hot-runner mold as claimed in claim 1, wherein the gate opening surface of said hot-runner block in which said gates open, and the molten resin pouring ports opening surface of said cavity block adapted to contact said gate opening surface and in which said molten resin pouring ports open are the surfaces which extend in the direction inclined to the direction along which said hot-runner block and said cavity block move relatively to each other.

8. A hot-runner block as claimed in claim 1, wherein the plane at which the gate opening surface of said hot-runner b-ock in which said gate open contacts the molten resin pouring port opening surface of said cavity block in which said molten resin pouring ports open makes substantially a right angle to the direction along which said hot-runner block and said cavity block are moved relatively to each other.

9. A hot-runner block as claimed in claim 7, wherein the gate opening surface of said hot-runner block in which said gates open is made to contact the molten resin pouring port opening surface of said cavity block in which said molten resin pouring ports open, at the time of injection, said surfaces being materially falt.

10. A hot-runner mold as claimed in claim 7, characterized by comprising a main runner formed through said hot-runner block to extend along the length of the latter, and a pair of materially flat gate opening surfaces which extend substantially in parallel with said main runner and in back-to-back relation to each other, wherein a plurality of said gates open in each of said gate opening surfaces.

11. A hot-runner mold as claimed in claim 7, wherein the portion of said hot-runner block at which said gates open are made to have a cylindrical or conical shape, and a plurality of said gates open in the peripheral surface of the cylindrically or conically shaped portion of said hot-runner block.

12. A hot-runner mold as claimed in claim 1, wherein said gate-temperature recovering block has a means for maintaining said gate-temperature recovering block at a predetermined constant high temperature.

13. A hot-runner mold as claimed in claim 1 or 12, characterized in that said gate-temperature recovering block is made of a metallic material.

14. A hot-runner mold as claimed in claim 1, characterized in that said gate-temperature recovering block is made of a composite material in the form of a thin film of a metal on the sliding surface of the heat-insulating material.

15. A hot-runner mold as claimed in claim 1, wherein said gate-temperature recovering block is adapted to contact the gate opening surface of said hot-runner block in which said gates open, thereby to close the openings of said gate.

16. A hot-runner mold as claimed in claim 1, characterized in that said gate-temperature recovering block is adapted to contact the outer surface of said hot-runner block at a portion of the latter other than the gate opening surface in which said gates open.

17. A hot-runner mold as claimed in claim 1, characterized by comprising means for exerting a force for resiliently biasing said gate-temperature recovering block into contact with said hot-runner block, when said blocks are brought into mutual contact.

18. A hot-runner mold as claimed in claim 1, wherein a portion of said hot-runner block is made to have a form of a plurality of rod-like members which project in the movement of said cavity block and said hot-runner block to each other, each of said rod-like members having an end surface in which one gate is made to open.

19. A hot-runner mold as claimed in claim 18, wherein the end portion of said rod-like member near said end surface in which said gate open is made to have a larger diameter than the intermediate portion of said rod-like member, said gate-temperature recovering block is adapted to be positioned to confront said intermediate portion of said rod-like member at least the time of injection, and is adapted to be brought into contact with said end portion having the larger diameter as said gates of said hot-runner block leave and clear corresponding molten resin pouring ports of said cavity block.

20. A hot-runner mold as claimed in claim 19, wherein each of said rod-like members of said hot-runner block has such an inversed conical shape as having a diameter gradually increasing as it gets closer to said end portion where said gate is located, while the portion of said gate-temperature recovering block adapted to be contact said rod-like member has a bore having an inversed conical inner peripheral surface which meets said inversed conical shape of said rod-like member, thereby to ensure a stable contact of said rod-like member and said gate-temperature recovering block with each other.

21. A hot-runner mold as claimed in claim 18 or 19, wherein the portion of said gate-temperature recovering block is made to have a hollow cylindrical body adapted to receive said rod-like member, the wall of said hollow cylindrical part has slits formed to extend in the axial direction of said hollow cylindrical part, whereby said rod-like member is received by said hollow cylindrical part spreading said slits, thereby to achieve a stable mutual contact between said rod-like member and said gate-temperature recovering block.

22. A hot-runner mold as claimed in claim 18 or 19, characterized in that said gate-temperature recovering block includes a carrier member and a plurality of contacting members adapted to contact corresponding rod-like members of said hot-runner block, wherein each of said contacting member is secured to said carrier member movably in the direction substantially normal to the line along which said hot-runner block and said gate-temperature recovering block move relatively to each other.

23. A hot-runner mold as claimed in claim 18 or 20, wherein said gate-temperature recovering block includes a carreir member and contacting members adapted to contact corresponding rod-like members of said hot-runner block, said contacting members being secured to said carrier member movably by a predetermined distance in the direction materially identical to the direction of the relative movement between said hot-runner block and said gate-temperature recovering block, and being resiliently biased by a biasing means such as a spring so that they may be resiliently pressed onto the corresponding rod-like members when contacting the latter.

* * * * *

UNITED STATES PATENT AND TRADEMARK OFFICE
CERTIFICATE OF CORRECTION

PATENT NO. : 4,212,624

DATED : July 15, 1980

INVENTOR(S) : NOBUO ANDO ET AL

It is certified that error appears in the above-identified patent and that said Letters Patent are hereby corrected as shown below:

On the title page of the patent, following the line which reads "[30] Foreign Application Priority Data", please delete the entire next line ("Dec. 9, 1976 ... 51-148060").

Signed and Sealed this

Third Day of February 1981

[SEAL]

Attest:

RENE D. TEGTMEYER

Attesting Officer

Acting Commissioner of Patents and Trademarks